United States Patent
Albrecht et al.

(10) Patent No.: US 6,887,435 B1
(45) Date of Patent: May 3, 2005

(54) INTEGRATED AIR FOIL AND AMMONIA INJECTION GRID FOR SCR SYSTEMS

(75) Inventors: Melvin J. Albrecht, Columbiana County, Knox Township, OH (US); Mark S. Bock, Wadsworth, OH (US); Kevin J. Rogers, Wadsworth, OH (US); Ted V. Mull, Jr., Ypsilanti, MI (US)

(73) Assignee: The Babcock & Wilcox Company, New Orleans, LA (US)

( * ) Notice: Subject to any disclaimer, the term of this patent is extended or adjusted under 35 U.S.C. 154(b) by 812 days.

(21) Appl. No.: 09/602,483

(22) Filed: Jun. 23, 2000

(51) Int. Cl.$^7$ .......................... B01D 47/00; B01D 50/00; B01F 3/04
(52) U.S. Cl. ....................... 422/172; 422/168; 422/169; 422/170; 261/116
(58) Field of Search .................... 422/168–172; 261/116

(56) References Cited

U.S. PATENT DOCUMENTS 4,980,099 A * 12/1990 Myers et al. ............... 261/116
5,599,508 A * 2/1997 Martinelli et al. .......... 422/169

* cited by examiner

Primary Examiner—Hien Tran
(74) Attorney, Agent, or Firm—Michael J. Seymour; Eric Marich

(57) ABSTRACT

An integrated air foil and ammonia injection grid provides a plurality of air foils across a flue conveying flue gas. Each air foil has a leading curved edge and a tapered, pointed, trailing end. At least one injection pipe is positioned inside each air foil, and has at least one nozzle for injecting ammonia into the flue gas flowing across the air foils. Preferably, plural injection tubes are provided and positioned one behind the other in each air foil, and each injection tube in a given air foil has a length different than a length of the other injection tubes in the same air foil. A longest injection tube in a given air foil is located furthest downstream and proximate the tapered trailing edge and a shortest injection tube in the same air foil is located furthest upstream, remaining injection tubes in the same air foil being progressively shorter the further upstream any injection tube is located. Apertures may be provided on opposed lateral sides of the air foils for introducing a gas flow into the flue gas passing across the air foils. Ammonia flow to each injection pipe may be individually controlled.

15 Claims, 3 Drawing Sheets

INTEGRATED AIR FOIL AND AMMONIA INJECTION GRID FOR SCR SYSTEMS

FIELD AND BACKGROUND OF THE INVENTION

1. Field of the Invention

The present invention relates generally to the field of utility and industrial boilers and furnaces and, in particular, to a new and useful integrated air foil and ammonia injection grid for use in a selective catalytic reduction (SCR) system which is used to reduce $NO_x$ emissions from such boilers and furnaces.

2. Description of the Related Art $NO_x$ refers to the cumulative emissions of nitric oxide (NO), nitrogen dioxide ($NO_2$) and trace quantities of other species generated during combustion. Combustion of any fossil fuel generates some level of $NO_x$ due to high temperatures and the availability of oxygen and nitrogen from both the air and fuel. Once the fuel has been selected, $NO_x$ emissions may be controlled using low $NO_x$ combustion technology and postcombustion techniques. One such post-combustion technique is selective catalytic reduction (SCR).

SCR systems catalytically reduce flue gas $NO_x$ to $N_2$ and $H_2O$ using ammonia ($NH_3$) in a chemical reduction. This technology is especially useful if high $NO_x$ removal efficiencies (70% to over 90%/o) are required. FIG. 1 illustrates a typical utility boiler having an SCR system installed downstream (with respect to a direction of flue gas flow through the utility boiler) of the boiler flue gas outlet and upstream of the air heater.

As schematically indicated in FIG. 1, ammonia ($NH_3$) is injected into and is mixed with the boiler flue gas via a grid 10. The $NO_x$ reduction reactions take place as the flue gas passes through a catalyst chamber (not shown) contained within the SCR. The $NO_x$ reactions with the $NH_3$ can be represented as follows:

(1)

(2).

For a general discussion of nitrogen oxides control in combustion processes, the reader is referred to Chapter 34 of *Steam/its generation and use,* 40th edition, Stultz and Kitto, Eds., Copyright© 1992 The Babcock & Wilcox Company, the text of which is hereby incorporated by reference as though fully set forth herein.

The catalysts used in SCR systems are carefully engineered and expensive. Thus it is beneficial to be able to control the stoichiometry of the exhaust gas/ammonia/catalyst reaction. In such SCR systems, the ammonia is typically introduced into the flue gas stream using an injection grid system comprised of sparger tubes having a plurality of injection ports or nozzles. The unit-specific grid system is designed to provide an even distribution of ammonia throughout the flue gas. The particular grid system configuration is based upon the size of the flue conveying the flue gas stream, as well as the distance from the injection grid to the inlet of the catalyst bed of the SCR. Longer distances require fewer ammonia injectors since adequate mixing can occur prior to the mixture of flue gas and ammonia entering into the SCR catalyst bed.

Ammonia injection grids with zone control have been installed to distribute a prescribed amount of ammonia for $NO_x$ reducing SCR systems. Static mixers are also known, and have been proposed to reduce thermal and/or flue gas species gradients by adding turbulent mixing in SCR flue systems. Commercially available in several forms from companies such as Koch and Chemineer, these static mixers are used to improve the degree of mixing between the ammonia and flue gas prior to entry into the SCR.

FIG. 2 shows one known design for an ammonia injection grid 10. There may be multiple horizontal zones (N zones total) across a width of the flue which conveys the boiler exhaust flue gas 50. Ammonia injection grid 10 is comprised of multiple arrays 20 of sparger tubes 30, each having a plurality of nozzles 40. The nozzles 40 are arranged so as to inject the ammonia into and parallel with the flue gas 50 towards the catalyst located downstream (not shown). Groupings of the tubes 30 in a given array 20 are supplied from independently controlled supply headers 60. By varying the length of the tubes 30 and the position/orientation of the nozzles 40, the ammonia can be selectively injected into the what can be defined as an upper vertical zone A, a lower vertical zone B, or both, as required, and in any of the N−1, N, and N+1 horizontal zones as shown.

While the grid design 10 in FIG. 2 permits greater control over the dispersion of ammonia into the exhaust gas stream, it also results in blockage of a large area of the exhaust gas 50 flow path within the flue. The blockage in turn results in a large flue gas side pressure drop between the furnace and stack (not shown). This gas side pressure drop is undesirable because greater power consumption is needed for the fans to convey the flue gas through the installation, thereby adversely affecting the overall efficiency of the boiler system.

Air foils have also been used for mixing gas streams have been used in secondary air supply ducts and SCR system flues. FIG. 3 schematically illustrates this concept; for the sake of simplicity only one such air foil has been shown. In practice, the arrangement would comprise a plurality of whole foils 70 in the center portions of the flue and half foils at the walls of the flue. As shown, a first gas flow A approaches a rounded front end 80 of the air foil 70. A second gas flow B is provided into an interior portion 90 of the air foil 70. Air foil 70 is provided with a plurality of apertures 100 at a front portion thereof out through which the second gas flow B is conveyed, thereby mixing gas flow B with gas flow A downstream of the air foil 70. Air foils have also been used extensively for flow measurement and control.

SUMMARY OF THE INVENTION

The present invention integrates an arrangement of air foils with an ammonia injection grid, whereby unrecoverable pressure losses are reduced. This is accomplished by locating a significant portion of the ammonia supply piping inside the air foil structures themselves. The aerodynamic shape of the air foil minimizes the flue system unrecoverable pressure loss. If desired, these same air foils can also be used for gas mixing.

The integrated air foil and ammonia injection grid according to the present invention minimizes system pressure loss while still achieving distribution of flue gas over the cross section of a flue in which it is installed to minimize thermal gradients. Improved distribution of ammonia into an exhaust gas stream with a desired degree of mixing of the ammonia with the flue gas can also be achieved without the use of a known static mixer device.

Accordingly, one aspect of the present invention is drawn to an integrated air foil and ammonia injection grid for a selective catalytic reduction (SCR) system. A plurality of air foils are arranged side-by-side and substantially parallel to one another in a flue, each air foil having a leading round edge and a trailing tapered edge with respect to a flow of flue gas across the air foils. At least one injection tube is positioned inside each air foil, each injection tube provided with at least one nozzle for injecting ammonia into the flue gas flowing across the air foils. Finally, means are provided for supplying ammonia to each injection tube.

Another aspect of the present invention is drawn to an integrated air foil and ammonia injection grid for a selective catalytic reduction (SCR) system, comprising a plurality of air foils arranged side-by-side and substantially parallel to one another in a flue, each air foil having a leading round edge and a trailing tapered edge with respect to a flow of flue gas across the air foils. A plurality of injection tubes are associated with each air foil, the injection tubes having different lengths and positioned one behind the other with the longest injection tube located closer to the tapered trailing edge, the remaining injection tubes being progressively shorter the further upstream the injection tube is located, each injection tube being provided with at least one nozzle for injecting ammonia into the flue gas flowing across the air foils. Finally, means are provided for supplying ammonia to each injection tube.

In yet another aspect of the present invention, there is provided an integrated air foil and ammonia injection grid for a selective catalytic reduction (SCR) system, comprising a plurality of air foils arranged side-by-side and substantially parallel to one another in a flue, each air foil having a leading round edge and a trailing tapered edge with respect to a flow of flue gas across the air foils. A plurality of injection tubes are positioned inside each air foil, the injection tubes having different lengths and positioned one behind the other with the longest injection tube located closer to the tapered trailing edge, the remaining injection tubes being progressively shorter the further upstream the injection tube is located, each injection tube being provided with at least one tee extension pipe extending from the injection tube, the tee extension pipe supporting at least one nozzle for injecting ammonia into the flue gas flowing across the air foils. Again, means are provided for supplying ammonia to each injection tube.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

Figure 1:
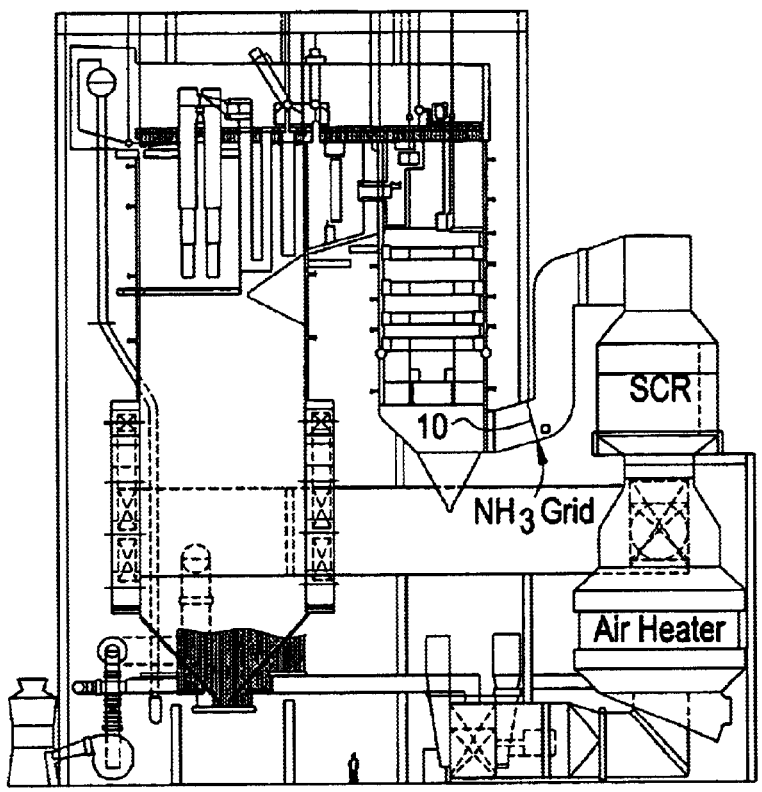
FIG. 1 illustrates a typical utility boiler having an SCR system installed downstream (with respect to a direction of flue gas flow through the utility boiler) of the boiler flue gas outlet and upstream of the air heater.
Figure 2:
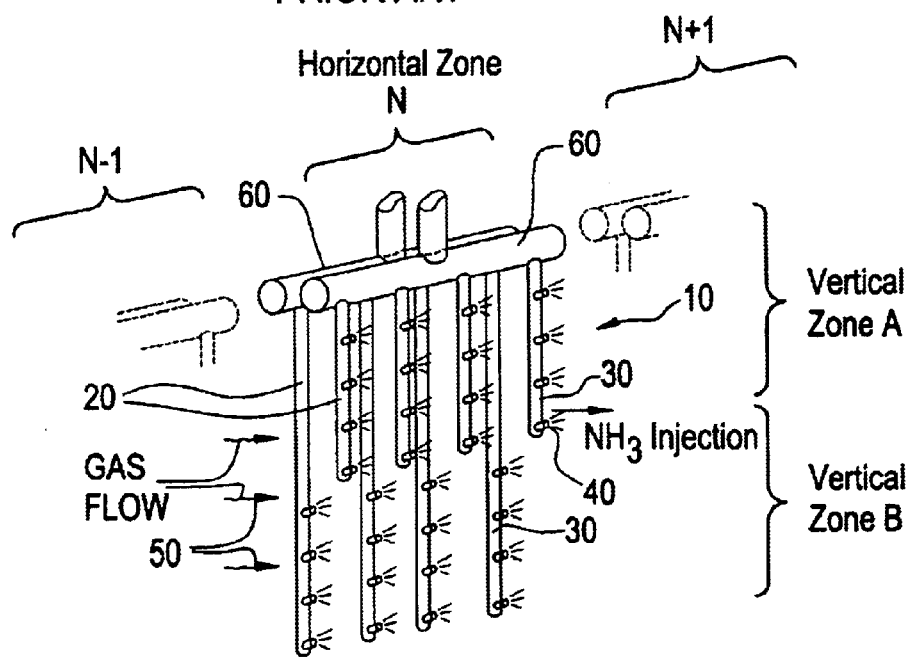
FIG. 2 is a perspective view of prior art ammonia injection grid.
Figure 3:
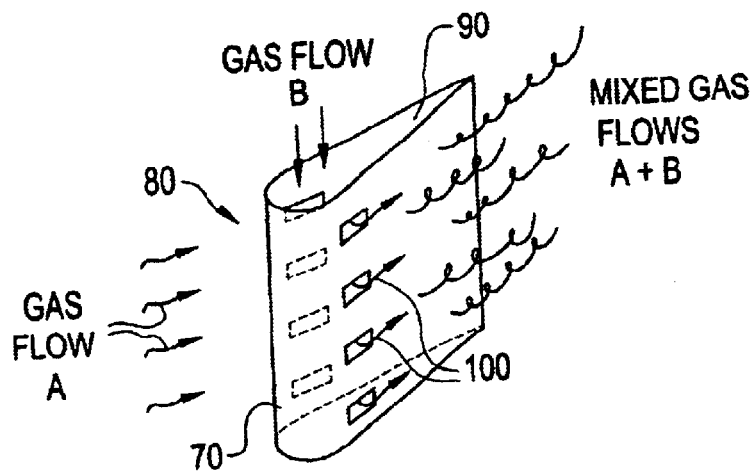
FIG. 3 is a perspective view of an air foil used for mixing gas streams in secondary air supply ducts and SCR system flues.
Figure 4:
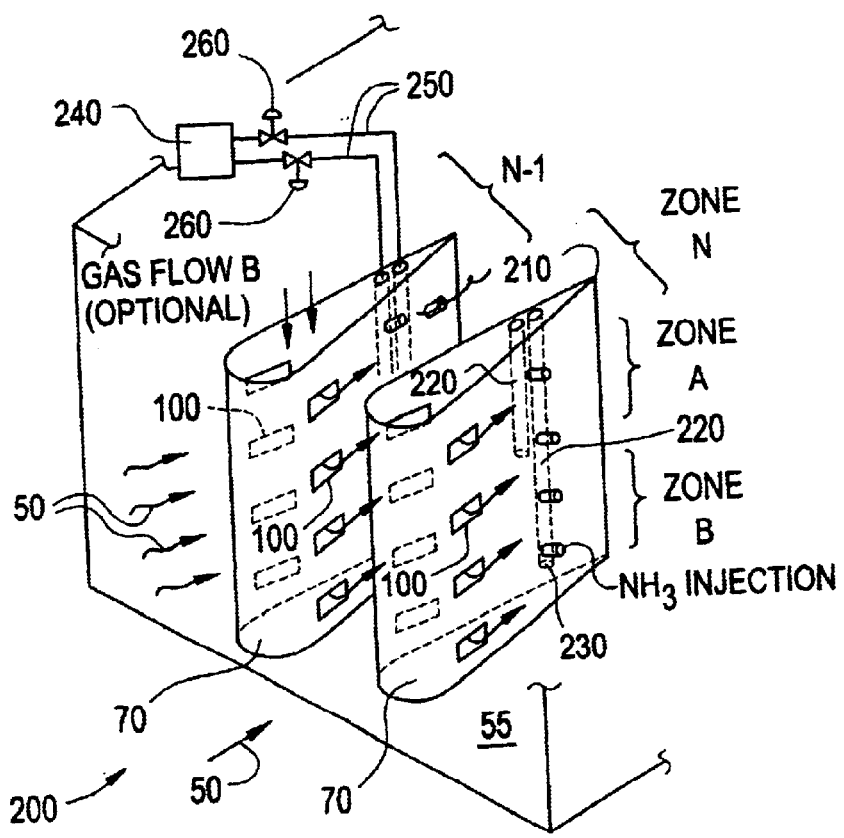
FIG. 4 is a front perspective view of a first embodiment of the integrated air foil and ammonia injection grid according to the present invention.
Figure 5:
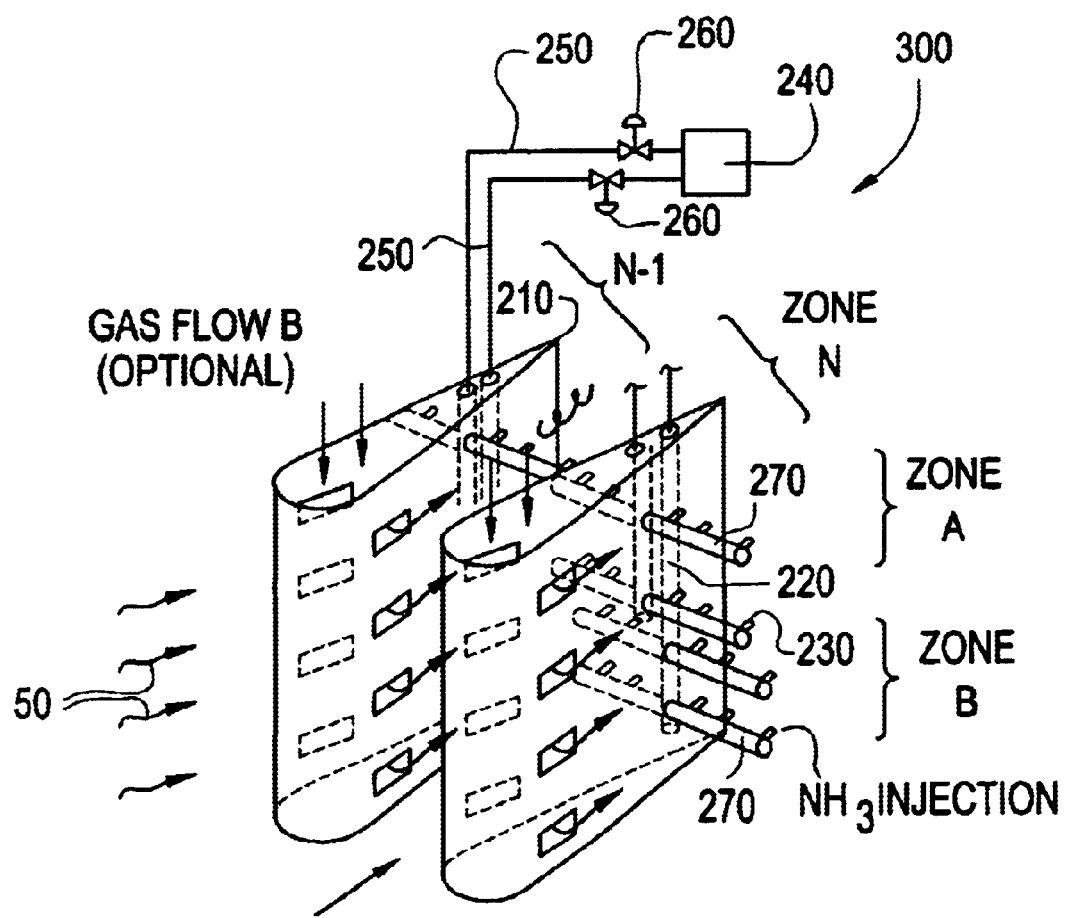
FIG. 5 is a front perspective view of a second embodiment of the integrated air foil ammonia injection grid according to the present invention.

Referring generally to the drawings, wherein like reference numerals designate the same or functionally similar elements throughout the several drawings, and to FIG. 4 in particular, there is shown a first embodiment of the integrated air foil and ammonia injection grid, generally designated 200, according to the present invention. The integrated air foil and ammonia injection grid according to the present invention is particularly suitable for injecting ammonia into flue gas streams conveyed within a flue and at a location upstream of an SCR system as described above. While the embodiments illustrated in FIGS. 4 and 5 show a vertical orientation of air foils comprising the invention, it will be understood by those skilled in the art that a horizontal orientation of the air foils could also be employed. It is also understood that the term "air foil" is used by way of example and not limitation; i.e., for the sake of convenience to generally describe the shape of such aerodynamic foil shapes, and not to mean that such devices are limited to use in air streams.

In practice, a plurality of air foils 70 would be located in a suitable portion of a flue (not shown) conveying the flue gas 50 to an SCR system containing catalyst. The air foils 70 would be regularly spaced across the width of a flue 55, perhaps with half-foils at the side walls of the flue 55. The air foils 70 would have a height equal to the height of the flue; their leading, curved edges 80 would be positioned upstream, while their tapered pointed ends 210 would be positioned downstream. The air foils 70 may be optionally provided with a plurality of apertures 100 on opposed lateral sides of the air foils 70 which apertures 100 could be used to introduce a second gas flow B into the flue gas 50. Apertures 100 can have any shape, such as rectangular, circular, or other so long as they are able to permit any such second gas flow B to be introduced into the flue gas 50.

The air foils 70 would be arranged side-by-side in the flue, substantially parallel to one another, again oriented either vertically (as shown) or horizontally, as the case may be.

In accordance with the invention, each air foil 70 is provided with at least one and preferably two injection tubes 220 associated with each air foil 70, preferably positioned inside each air foil 70 closer to the tapered trailing edge 210 than to the round leading edge 80. The injection tubes 220 are positioned one behind the other in each air foil 70; preferably, the injection tube 220 located closest to the tapered trailing edge 210 is longer than other injection tubes 220 in the same air foil 70, and the injection tubes 220 become progressively shorter the further upstream any injection tube 220 is located. This gives a staggered appearance to injection tubes 220, with the shortest tube 220 proximate the front of the air foil 70 and the longest injection tube 220 proximate the rear of the air foil 70.

Each injection tube 220 is provided with at least one and preferably a plurality of nozzles 230 along a length of the injection tubes 220. The nozzles 230 extend through a wall of the air foil 70 so that ammonia can be injected into the flue gas 50. The size of the nozzles 230 are selected based upon the quantity of ammonia to be delivered into the flue gas 50. The orientation of the nozzles 230 can be selected as desired; an oblique orientation may be desired to avoid having the ammonia contacting an adjacent air foil 70. Preferably, nozzles 230 of each injection tube in a given air foil 70 are offset or staggered to achieve a uniform injection pattern into the flue gas 50 passing across the air foils 70.

Each injection tube 220 is connected to a source of ammonia 240 by means of ammonia piping 250 and control valves 260 are used to individually control a flow rate of ammonia from the source 240 to a given injection tube 220. Thus, control of the amount of ammonia introduced into specific zones A and B, as illustrated, may be accomplished.

Referring to FIG. 5, there is shown a slightly different embodiment of the integrated air foil and ammonia injection grid, generally designated 300, according to the present invention. The main difference in this embodiment is that the nozzles 230 are not located directly on the injection tubes 220, but instead are provided on tee extension pipes 270 provided on and extending substantially perpendicularly from the injection tubes 220. Preferably a plurality of tee extension pipes 270 may be employed on opposite sides of the injection tubes 220, each having a plurality of nozzles 230 thereon. The tee extension pipes 270 thus extend through walls of the air foils 70, and the nozzles 230 are located thereon, in between adjacent air foils 70. Sizing of all ammonia injection components, injection pipes 220, nozzles 230, piping 250, valves 260, and tee extension pipes 270 would again be determined as a function of the amount of ammonia to be delivered into the flue gas 50.

According to the present invention, and in the case where apertures 100 are employed in the air foils 70, the air foils 70 used in combination with the ammonia injection grid create a low pressure region due to their aerodynamic shape resulting in an aspirating effect that draws any gas flow B, such as flue gas bypassed into this location, provided into an internal portion of the air foils 70 out of the air foil 70 and into the main flue gas stream 50. In the case of unbalanced gas flow, as local gas flow rates change, the low pressure region created by the local gas flow will proportionally change the local aspiration. Thus, drawing a proportional quantity of bypass flue gas and ammonia compensates for the unbalanced flow distribution. This self-adjustment is beneficial to maintaining $NO_x$ reduction efficiency and catalyst life. The wake from the air foils 70 also adds static mixing to the system. Mixing of ammonia is improved by injecting ammonia in the wake of the air foils 70 where turbulence is high. Thus, the system is less likely to require static mixing devices. The distribution of ammonia is further improved due to additional residence time since injection can occur further upstream in the system with the integrated design. If necessary, the internal volume of the air foils 70 can be segmented to provide a plenum for distribution of ammonia to each injection tube 220 or nozzle 230.

With cross-flow injection of ammonia, the nozzles 230 can be arranged and located in the center of the air foils' 70 bypass gas slots or apertures 100. In this arrangement, the ammonia injection stream can be shrouded by the hotter gas temperature of the second gas flow B. The hotter gas flow B will protect the ammonia injection nozzles 230 from the buildup of precipitate that can form at lower gas temperatures. The bypass gas flow B would also provide purging which facilitates the movement of the ammonia laden stream into the bulk flue gas stream A.

While a specific embodiment of the invention has been shown and described in detail to illustrate the application of the principles of the invention, it will be understood that the invention may be embodied otherwise without departing from such principles.

We claim:

1. An integrated air foil and ammonia injection grid for a selective catalytic reduction (SCR) system, comprising:
    a plurality of air foils arranged side-by-side and substantially parallel to one another in a flue, each air foil having a leading round edge and a trailing tapered edge with respect to a flow of flue gas across the air foils;
    a plurality of injection tubes positioned one behind the other in each air foil, each injection tube provided with at least one nozzle for injecting ammonia into the flue gas flowing across the air foils; and
    means for supplying ammonia to each injection tube.

2. The integrated air foil and ammonia injection grid according to claim 1, wherein each injection tube in a given air foil has a length different than a length of the other injection tubes in the same air foil.

3. The integrated air foil and ammonia injection grid according to claim 1, wherein a longest injection tube in a given air foil is located furthest downstream and proximate the tapered trailing edge and a shortest injection tube in the same air foil is located furthest upstream, remaining injection tubes in the same air foil being progressively shorter the further upstream any injection tube is located.

4. The integrated air foil and ammonia injection grid according to claim 1, wherein each injection tube is proximate the trailing tapered edge of the air foil.

5. The integrated air foil and ammonia injection grid according to claim 1, comprising a plurality of apertures on opposed lateral sides of the air foils for introducing a gas flow into the flue gas passing across the air foils.

6. The integrated air foil and ammonia injection grid according to claim 1, wherein each injection tube is provided with a plurality of nozzles.

7. The integrated air foil and ammonia injection grid according to claim 1, wherein each injection tube is provided with a plurality of nozzles.

8. The integrated air foil and ammonia injection grid according to claim 7, wherein the nozzles of each injection tube are offset from the nozzles of the other injection tubes located in the same air foil.

9. The integrated air foil and ammonia injection grid according to claim 1, wherein each injection tube comprises at least one tee extension pipe extending from the injection tube, the tee extension pipe supporting the at least one nozzle.

10. The integrated air foil and ammonia injection grid according to claim 1, wherein the plurality of air foils extends substantially vertically within the flue.

11. The integrated air foil and ammonia injection grid according to claim 1, wherein the plurality of air foils extends substantially horizontally within the flue.

12. The integrated air foil and ammonia injection grid according to claim 1, wherein an internal volume of each air foil is segmented to provide a plenum and the means for supplying ammonia to each injection tube provides the ammonia into the plenum for distribution of ammonia to the injection tubes and nozzles associated with each air foil.

13. The integrated air foil and ammonia injection grid according to claim 1, wherein each air foil is provided with at least one aperture and the at least one nozzle is positioned so as to deliver the ammonia through the at least one aperture into the flue gas flow.

14. An integrated air foil and ammonia injection grid for a selective catalytic reduction (SCR) system, comprising:
    a plurality of air foils arranged side-by-side and substantially parallel to one another in a flue, each air foil having a leading round edge and a trailing tapered edge with respect to a flow of flue gas across the air foils;
    a plurality of injection tubes positioned inside each air foil, the injection tubes having different lengths and positioned one behind the other with the longest injection tube located closer to the tapered trailing edge, the remaining injection tubes being progressively shorter the further upstream the injection tube is located, each injection tube being provided with at least one nozzle for injecting ammonia into the flue gas flowing across the air foils; and means for supplying ammonia to each injection tube.

15. An integrated air foil and ammonia injection grid for a selective catalytic reduction (SCR) system, comprising:

a plurality of air foils arranged side-by-side and substantially parallel to one another in a flue, each air foil having a leading round edge and a trailing tapered edge with respect to a flow of flue gas across the air foils;

a plurality of injection tubes positioned inside each air foil, the injection tubes having different lengths and positioned one behind the other with the longest injection tube located closer to the tapered trailing edge, the remaining injection tubes being progressively shorter the further upstream the injection tube is located, each injection tube being provided with at least one tee extension pipe extending from the injection tube, the tee expansion pipe supporting at least one nozzle for injecting ammonia into the flue gas flowing across the air foils; and means for supplying ammonia to each injection tube.

* * * * *